United States Patent
Henke et al.

(10) Patent No.: US 8,973,971 B1
(45) Date of Patent: Mar. 10, 2015

(54) TUBULAR DOOR REINFORCEMENT BEAM

(71) Applicant: GM Global Technology Operations LLC, Detroit, MI (US)

(72) Inventors: Fritz R. Henke, São Paulo (BR); Carlos A. Lopes, São Paulo (BR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/073,398

(22) Filed: Nov. 6, 2013

(51) Int. Cl.
*B60J 5/04* (2006.01)

(52) U.S. Cl.
CPC .................................. *B60J 5/0444* (2013.01)
USPC .......................................... 296/146.6; 49/502

(58) Field of Classification Search
CPC ...................................................... B60J 5/0437
USPC .................. 296/146.6, 187.1, 187.12; 49/502
See application file for complete search history.

(56) References Cited

U.S. PATENT DOCUMENTS

| | | | | |
|---|---|---|---|---|
| 3,520,165 A * | 7/1970 | Dodson | .............................. | 72/64 |
| 4,708,390 A * | 11/1987 | Palentyn et al. | ........... | 296/146.6 |
| 4,842,051 A * | 6/1989 | Brownlee | ........................ | 165/93 |
| 4,919,473 A * | 4/1990 | Laimighofer et al. | ... | 296/187.12 |
| 5,094,034 A * | 3/1992 | Freeman | ......................... | 49/501 |
| 5,123,694 A * | 6/1992 | DePierre et al. | ......... | 296/187.12 |
| 5,277,469 A * | 1/1994 | Klippel | ...................... | 296/146.6 |
| 5,404,690 A * | 4/1995 | Hanf | ........................... | 296/146.6 |
| 5,417,470 A * | 5/1995 | Holt | ........................... | 296/187.12 |
| 6,290,282 B1 * | 9/2001 | Hortlund et al. | ........... | 296/146.6 |
| 6,390,534 B1 * | 5/2002 | Lee et al. | ................... | 296/146.6 |
| 6,568,742 B2 * | 5/2003 | Seo | .............................. | 296/146.6 |
| 6,722,037 B2 * | 4/2004 | Nees et al. | .................... | 29/897.2 |
| 2008/0315619 A1 * | 12/2008 | Oka | ........................... | 296/146.6 |

\* cited by examiner

*Primary Examiner* — Pinel Romain
(74) *Attorney, Agent, or Firm* — Quinn Law Group, PLLC

(57) ABSTRACT

A door for selectively opening and closing at least a portion of an opening in a vehicle includes an outer door panel and an inner door panel. The inner panel is attached to the outer panel thus defining a space between the inner and outer panels. The door also includes a tubular reinforcement beam disposed in the space between the inner and outer door panels. The tubular reinforcement beam is attached to the door and has varying material thicknesses. A vehicle having a vehicle body that defines an opening and a subject door configured to selectively open and close at least a portion of the opening is also disclosed.

16 Claims, 5 Drawing Sheets

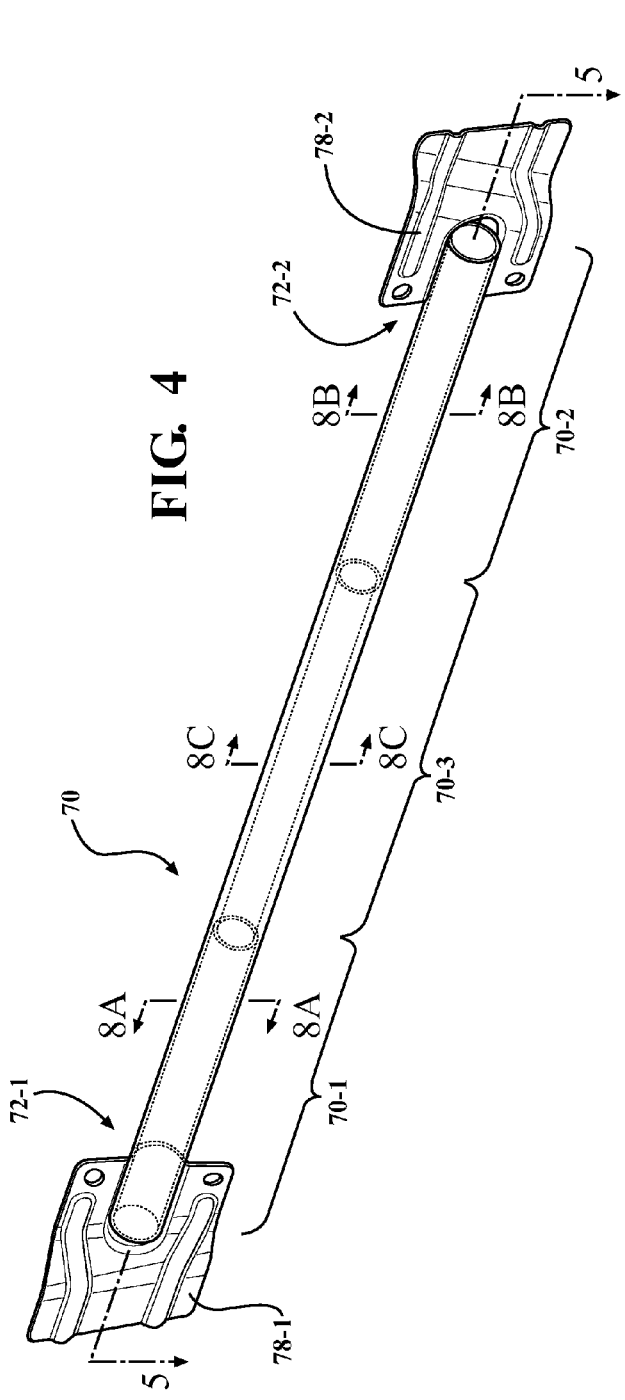
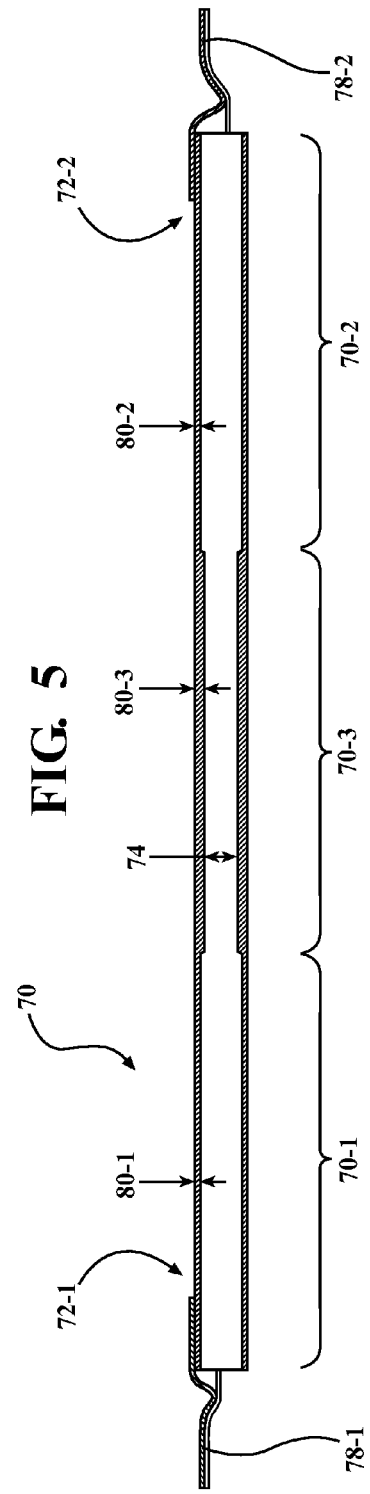

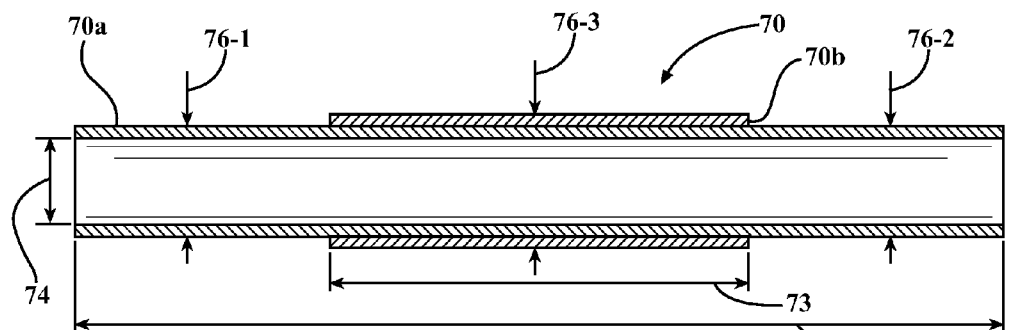
FIG. 6
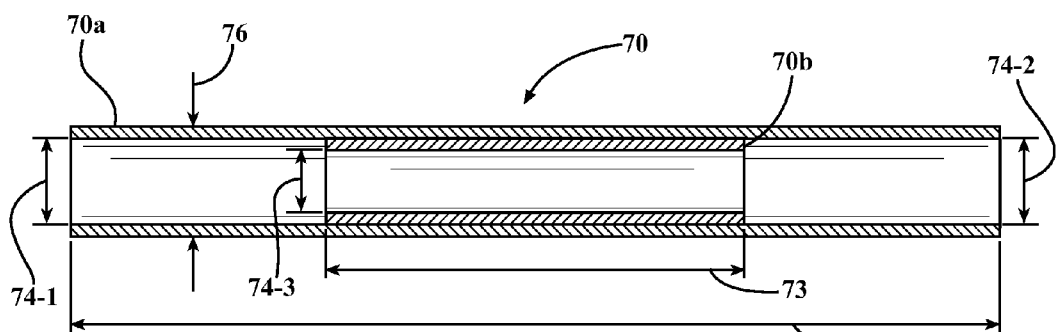
FIG. 7
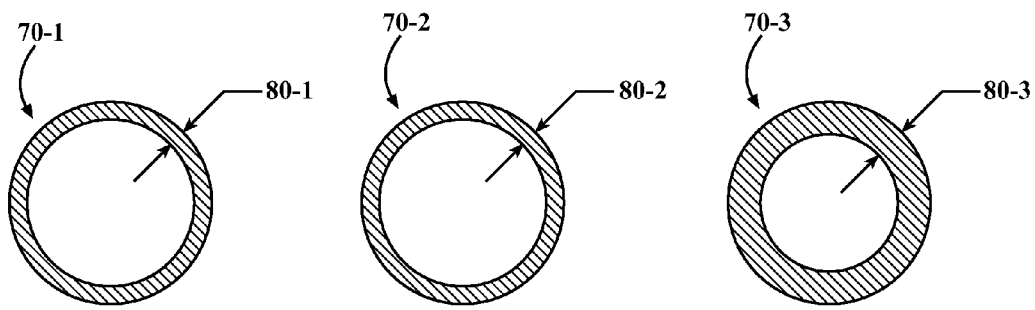
FIG. 8A  FIG. 8B  FIG. 8C

TUBULAR DOOR REINFORCEMENT BEAM

TECHNICAL FIELD

The disclosure relates to a tubular beam for reinforcement of a door in a vehicle.

BACKGROUND

A door is a movable structure used to open and close off an entrance, typically consisting of a panel that swings on hinges or that slides or rotates inside a space. When open, doors admit ventilation and light. A door may be used to control physical atmosphere within a space so that an interior may be more effectively heated or cooled. Doors also act as a barrier to noise, inclement weather, and physical intrusion into a specifically defined space. In contemporary motor vehicles, besides carrying the above-mentioned functions, doors are frequently reinforced to reduce the degree of deformation in the door structure in case such a door is subjected to energy generated by an external force.

SUMMARY

A door for selectively opening and closing at least a portion of an opening in a vehicle includes an outer door panel and an inner door panel. The inner panel is attached to the outer panel thus defining a space between the inner and outer panels. The door also includes a tubular reinforcement beam disposed in the space between the inner and outer door panels. The tubular reinforcement beam is attached to the door and has varying material thicknesses.

The reinforcement beam may have a first tubular portion characterized by a first cross-section, a second tubular portion characterized by a second cross-section, and a third tubular portion characterized by a third cross-sectional view. In the first cross-section, the first tubular portion may have a first material thickness. In the second cross-section, the second tubular portion has a second material thickness. In the third cross-section, the third tubular portion may have a third material thickness. Furthermore, the first material thickness and the second material thickness may be substantially equivalent, while the third material thickness may be different from the first and second material thicknesses.

The first, second, and third tubular portions may collectively be defined by a single monolithic piece (tube) of steel.

The tubular reinforcement beam may include a first tube and a second tube. In such a case the first tube may be fixed inside a second tube, such that the first tube defines the first and second tubular portions, and the first and the second tubes define the third tubular portion.

The first tubular portion may be positioned at a first distal end of the beam, the second tubular portion may be positioned at a second distal end of the beam, and the third tubular portion may be positioned between the first and second distal ends of the beam.

The first, second, and third tubular portions may be defined by a substantially uniform outer diameter. Additionally, the first and second tubular portions may be defined by first and second inner diameters, respectively, while the third tubular portion may be defined by a third inner diameter. Furthermore, the first inner diameter may be equal to the second inner diameter and the third inner diameter may be smaller than each of the first and second inner diameters.

The first and second distal ends may be attached to the inner door panel.

The reinforcement beam may include a first bracket at the first distal end of the beam end and a second bracket at the second distal end of the beam. The first distal end of the beam may be attached to the first bracket and the first bracket may be attached to the inner door panel. The second distal end of the beam may be attached to the second bracket and the second bracket may be attached to the inner door panel.

The first and second brackets may be attached to the inner door panel by at least one of a weld and a fastener.

The third material thickness may be greater than each of the first material thickness and the second material thickness by at least 50%.

A vehicle employing the door as described above is also disclosed.

The above features and advantages, and other features and advantages of the present disclosure, will be readily apparent from the following detailed description of the embodiment(s) and best mode(s) for carrying out the described invention when taken in connection with the accompanying drawings and appended claims.

BRIEF DESCRIPTION OF THE DRAWINGS

FIG. 4 is a schematic perspective view of an embodiment of the tubular reinforcement beam shown in FIGS. 1 and 2.

FIG. 5 is a schematic sectional view of the embodiment of the reinforcement beam shown in FIG. 4.

FIG. 6 is a schematic sectional view of the tubular reinforcement beam according to another embodiment.

FIG. 7 is a schematic sectional view of the tubular reinforcement beam according to yet another embodiment.

FIG. 8A is a schematic cross-sectional view of a first portion of the tubular reinforcement beam shown in FIGS. 1-7.

FIG. 8B is a schematic cross-sectional view of a second portion of the tubular reinforcement beam shown in FIGS. 1-7.

FIG. 8C is a schematic cross-sectional view of a third portion of the tubular reinforcement beam shown in FIGS. 1-7

DETAILED DESCRIPTION

Figure 1:
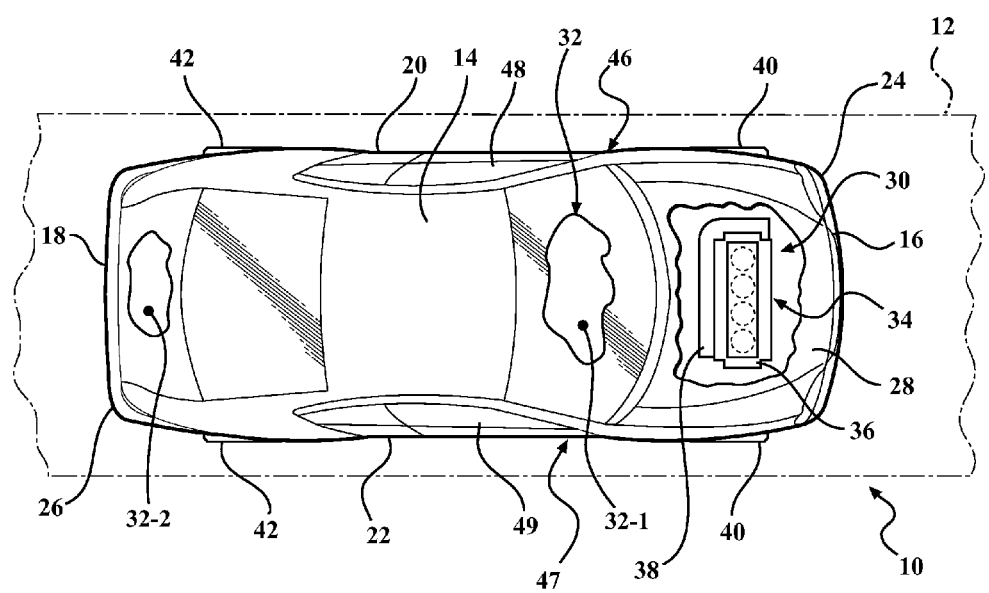
FIG. 1 is a schematic top view of a vehicle including side doors with an attached reinforcement beam enclosed therein.

Referring to the drawings, wherein like reference numbers refer to like components, FIG. 1 shows a schematic view of a motor vehicle 10 positioned relative to a road surface 12. The vehicle 10 includes a vehicle body 14. The vehicle body 14 defines four body sides. The four body sides include a first or front end 16, a second or rear end 18, a left side 20, and a right side 22. As shown, the front end 16 may include a front bumper assembly 24, while the rear end 18 may include a rear bumper assembly 26. The vehicle body 14 also includes a hood 28 configured to cover at least a portion of the front end 16 to thereby define an under-hood compartment 30. The vehicle body 14 also defines an interior portion 32 of the vehicle 10 that may include a passenger compartment 32-1 positioned between the under-hood compartment 30 and the rear end 18 and a cargo area 32-2.

The under-hood compartment 30 houses a powertrain 34 that is configured to propel the vehicle 10. As shown in FIG. 1, the powertrain 34 may include an internal combustion (IC) engine 36 and a transmission 38. The powertrain 34 may also include one or more motor/generators as well as a fuel cell, neither of which are shown, but a powertrain configuration employing such devices is appreciated by those skilled in the art. The vehicle 10 also includes front wheels 40 and rear wheels 42. Depending on specific configuration of the powertrain 34, power of the engine 36 may be transmitted to the road surface 12 through the front wheels 40, the rear wheels 42, or through all the wheels 40 and 42 using a suspension system (not shown).

As may be additionally seen in FIG. 1, the vehicle body 14 also defines openings 46, 47, respectively, at the left and right body sides 20, 22. As shown, each of the left and right body sides 20 and 22 includes a door. Such doors are configured to selectively open and close at least a portion of the openings 46, 47, respectively, in order to provide passenger ingress/egress to/from the passenger compartment 32-1. Specifically, the left side 20 includes a door 48, while the right side includes a door 49. Although a single door is shown on each of the body sides 20 and 22, fewer or great number of doors may be provided on each side. Furthermore, such door(s) may also be provided at the rear end 18, as, for example, in a cargo-carrying vehicle like a van, for gaining access to the cargo area 32-2.

Figure 2:
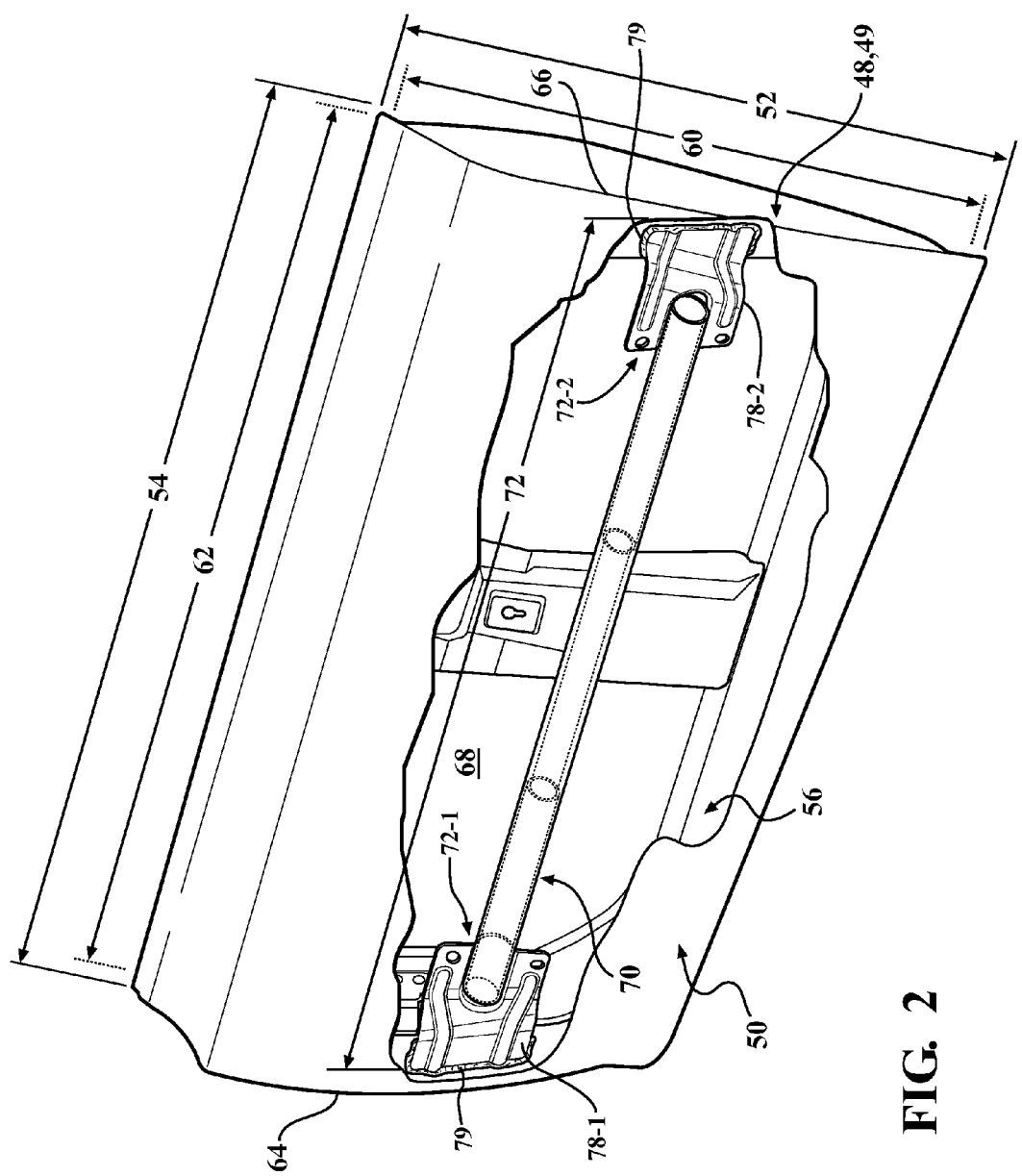
FIG. 2 is a schematic close-up partial break-away side view of one of the doors shown in FIG. 1 depicting the attached reinforcement beam.

As shown in FIG. 2, each door 48, 49 includes an outer door panel 50 that is characterized by height 52 and length 54. Each door 48, 49 also includes an inner door panel 56 that is attached to the outer door panel 50. While the outer door panel 50 provides part of the exterior of the vehicle body 14, the inner door panel 56 provides a surface for mounting various trim pieces that are part of the interior of passenger compartment 32-1. The inner door panel 56 is characterized by height 60 and length 62. The height 60 and length 62 of the inner door panel 56 are substantially coextensive with the height 52 and length 54, respectively, of the outer door panel 50, i.e., the respective inner and outer door panel lengths and widths are generally equivalent. The length 62 includes a first end 64 and a second end 66, which provide regions for attachment of the inner door panel 56 to the outer door panel 50. The attachment of the inner door panel 56 to the outer door panel 50 may be affected by such methods as fastening or welding. Upon attachment of the inner door panel 56 to the outer door panel 50, a space 68 is defined between the inner door panel and the outer door panel.

Figure 3:
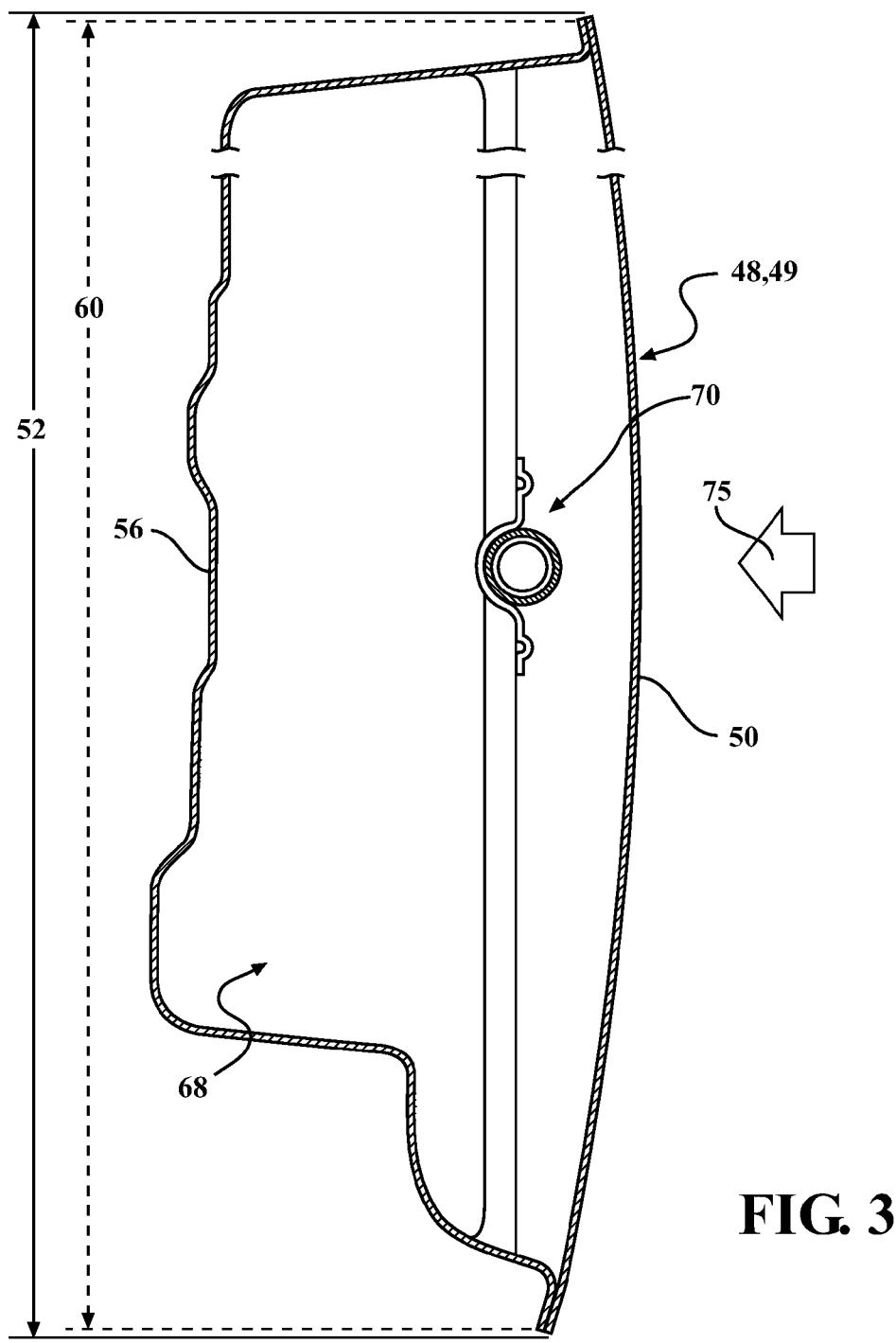
FIG. 3 is a schematic sectional view of the door shown in FIG. 2.

Each door 48, 49 also includes a tubular reinforcement beam 70 having a length 72 that is defined by two opposing or distal ends 72-1 and 72-2. In a number of cross-sectional views that will be described in greater detail below, the beam 70 is also defined by an inner diameter 74 and an outer diameter 76. The length 72 is substantially equal to the length 62 of the inner door panel 56, i.e., the length of the beam 70 is generally, but necessarily fully, coextensive with the length of the inner door panel. The beam 70 is attached to the inner door panel 56 such that the beam is disposed in the space 68. The beam 70 may be constructed from steel and fixed to the inner door panel 56 at each of the beam's two distal ends 72-1 and 72-2. The beam 70 is configured to provide absorption of energy from an external force 75 applied to the vehicle 10 at the door 48 or 49 (shown in FIG. 3).

As shown in FIG. 2, the beam 70 also includes a first bracket 78-1 at the first distal end 72-1 of the beam and a second bracket 78-2 at the second distal end 72-2. The first distal end 72-1 is attached to the first bracket 78-1 and the first bracket is in turn attached to the inner door panel 56. Likewise, the second distal end 72-1 is attached to the second bracket 78-2, which is in turn attached to the inner door panel 56. The attachment of the first and second brackets 78-1, 78-2 to the respective distal ends 72-1, 72-2 may be affected by an appropriate high strength joint, such as a weld (not shown). Furthermore, attachment of each of the first and second brackets 78-1, 78-2 to the inner door panel 56 may be affected by a weld 79 and/or a fastener (not shown).

The beam 70 is defined by varying material thicknesses. As shown in FIG. 4, the beam 70 has a first tubular portion 70-1 characterized by a first cross-section 8A-8A, a second tubular portion 70-2 characterized by a second cross-section 8B-8B, and a third tubular portion 70-3 characterized by a third cross-section 8C-8C. The first cross-section 8A-8A, the second cross-section 8B-8B, and the third cross-section 8C-8C are shown in detail in FIGS. 8A, 8B, and 8C, respectively. As shown in FIG. 4, the first tubular portion 70-1 is positioned at the first distal end 72-1, the second tubular portion 70-2 is positioned at the second distal end 72-2, and the third tubular portion 70-3 is positioned between the first distal end 72-1 and the second distal end 72-2. In the first cross-section 8A-8A, the first tubular portion 70-1 has a first material thickness 80-1 (FIG. 8A). In the second cross-section 8B-8B, the second tubular portion 70-2 has a second material thickness 80-2 (FIG. 8B). In the third cross-section 8C-8C, the third tubular portion 70-3 has a third material thickness 80-3 (FIG. 8C).

According to one embodiment of the beam 70, the first material thickness 80-1 and the second material thickness 80-2 may be substantially equivalent, i.e., within manufacturing tolerances of the selected nominal thickness for the employed material. As shown, the third material thickness 80-3 is greater than each of the first material thickness 80-1 and the second material thickness 80-2. In a particular embodiment, the third material thickness 80-3 may be greater than each of the first material thickness 80-1 and the second material thickness 80-2 by at least 50%.

As shown in FIG. 5, the first, second, and third tubular portions 70-1, 70-2, and 70-3 may altogether, i.e., collectively, be defined by a monolithic tube formed from a single piece of steel or another material having appropriate strength and stiffness. As an alternative, the beam 70 maybe assembled from individual pieces to form the first, second, and third tubular portions 70-1, 70-2, and 70-3. In the case of an assembled beam 70, a longer first tube 70a having the length 72 and defined by the first and second distal ends 72-1 and 72-2 may be assembled with a shorter second tube 70b having a length 73.

According to a first embodiment of the beam 70 shown in FIG. 6, the first, second, and third tubular portions 70-1, 70-2, and 70-3 are all defined by a substantially uniform inner diameter 74. Additionally, the first tubular portion 70-1 is defined by a first outer diameter 76-1, while the second tubular portion 70-2 is defined by a second outer diameter 76-2. Furthermore, the first outer diameter 76-1 is equal to the second outer diameter 76-2 and the third tubular portion 70-3 is defined by a third outer diameter 76-3 that is greater than each of the first and second outer diameters. In the case of an assembled tube 70 of the first embodiment, the first tube 70a may be inserted into the second tube 70b and fixed therein. In such a case, the second tube 70b becomes positioned intermediate the first and second distal ends 72-1 and 72-2 on the outside of the first tube 70a. As noted above, the entire tube 70 may be defined by a monolithic tube formed from a single piece of material.

According to a second embodiment of the beam 70 shown in FIGS. 4-6, the first, second, and third tubular portions 70-1, 70-2, and 70-3 are all defined by a substantially uniform outer diameter 76. Additionally, the first tubular portion 70-1 is defined by a first inner diameter 74-1, while the second tubular portion 70-2 is defined by a second inner diameter 74-2.

Furthermore, the first inner diameter 74-1 is equal to the second inner diameter 74-2 and the third tubular portion 70-3 is defined by a third inner diameter 74-3 that is smaller than each of the first and second inner diameters. In the case of an assembled tube 70 of the second embodiment, the shorter second tube 70b may be inserted into the longer first tube 70a and fixed therein. In such a case, the shorter tube 70b becomes positioned intermediate the first and second distal ends 72-1 and 72-2 inside the first tube 70a. Additionally, as noted above, the entire tube 70 may also be defined by a monolithic tube formed from a single piece of material (shown in FIGS. 4-5).

In each of the embodiments described above, the first and the second tubes 70a and 70b together define the third tubular portion 70-3, while the first tube 70a alone defines the first and second tubular portions 70-1 and 70-2. Accordingly, in each of the disclosed embodiments, the third material thickness 80-3 of the third tubular portion 70-3 is greater than each of the first material thickness 80-1 and the second material thickness 80-2 of the respective first and second tubular portions 70-1 and 70-2. Additionally, in each of the embodiments, one of the tubes 70a or 70b may be inserted into the other tube and fixed therein, for example, by an interference fit via a joining process such as swaging or a weld, such that the shorter tube 70b is positioned intermediate the first and second distal ends 72-1 and 72-2, with respect to the longer tube 70a. Furthermore, in each of the embodiments, the first tube 70a and the second tube 70b may also be formed from dissimilar materials, such as from different grades of steel. For example, the second tube 70b may be formed from a higher grade steel relative to the first tube 70a, thereby providing additional strength increase for the third tubular portion 70-3 as compared with the first and second tubular portions 70-1 and 70-2.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
 a vehicle body defining an opening; and
 a door configured to selectively open and close at least a portion of the opening, the door having:
  an outer door panel;
  an inner door panel attached to the outer door panel wherein a space is defined between the inner door panel and the outer door panel; and
  a tubular reinforcement beam disposed in the space between the inner and outer door panels, attached to the door, and having varying material thicknesses;
 wherein:
  the tubular reinforcement beam has a first tubular portion having a first cross-section, a second tubular portion having a second cross-section, and a third tubular portion having a third cross-section;
  in the first cross-section, the first tubular portion has a first material thickness;
  in the second cross-section, the second tubular portion has a second material thickness;
  in the third cross-section, the third tubular portion has a third material thickness; and
  the first material thickness and the second material thickness are equivalent, and the third material thickness is different from the first and second material thicknesses;
  the first, second, and third tubular portions are defined by a uniform inner diameter;
  the first and second tubular portions have respective first and second inner diameters, and the third tubular portion is defined by a third inner diameter; and
  the first inner diameter is equal to the second inner diameter and the third outer diameter is greater than each of the first and second outer diameters.

2. The vehicle of claim 1, wherein the first, second, and third tubular portions are collectively defined by a single monolithic piece of material.

3. The vehicle of claim 1, wherein:
 the tubular reinforcement beam includes a first tube fixed inside a second tube;
 the first tube defines the first and second tubular portions; and
 the first and the second tubes define the third tubular portion.

4. The vehicle of claim 1, wherein the first tubular portion is positioned at a first distal end of the reinforcement beam, the second tubular portion is positioned at a second distal end of the reinforcement beam, and the third tubular portion is positioned between the first and second distal ends of the reinforcement beam.

5. The vehicle of claim 4, wherein the first and second distal ends are attached to the inner door panel.

6. The vehicle of claim 4, wherein:
 the reinforcement beam includes a first bracket at the first distal end of the beam and a second bracket at the second distal end of the beam;
 the first distal end of the beam is attached to the first bracket and the first bracket is attached to the inner door panel; and
 the second distal end of the beam is attached to the second bracket and the second bracket is attached to the inner door panel.

7. The vehicle of claim 6, wherein the first and second brackets are attached to the inner door panel by at least one of a weld and a fastener.

8. The vehicle of claim 1, wherein the third material thickness is greater than each of the first material thickness and the second material thickness.

9. A door for a vehicle comprising:
 an outer door panel;
 an inner door panel attached to the outer door panel, wherein a space is defined between the inner door panel and the outer door panel; and
 a tubular reinforcement beam disposed in the space between the inner and outer door panels, attached to the door, and having varying material thicknesses
 wherein:
  the tubular reinforcement beam has a first tubular portion having a first cross-section, a second tubular portion having a second cross-section, and a third tubular portion having a third cross-section;

in the first cross-section, the first tubular portion has a first material thickness;
in the second cross-section, the second tubular portion has a second material thickness;
in the third cross-section, the third tubular portion has a third material thickness; and
the first material thickness and the second material thickness are equivalent, and the third material thickness is different from the first and second material thicknesses;
the first, second, and third tubular portions are defined by a uniform inner diameter;
the first and second tubular portions have respective first and second inner diameters, and the third tubular portion is defined by a third inner diameter; and
the first inner diameter is equal to the second inner diameter and the third outer diameter is greater than each of the first and second outer diameters.

10. The door of claim 9, wherein the first, second, and third tubular portions are collectively defined by a single monolithic piece of steel.

11. The door of claim 9, wherein:
the tubular reinforcement beam includes a first tube fixed inside a second tube;
the first tube defines the first and second tubular portions; and
the first and the second tubes define the third tubular portion.

12. The door of claim 9, wherein the first tubular portion is positioned at a first distal end of the beam, the second tubular portion is positioned at a second distal end of the beam, and the third tubular portion is positioned between the first and second distal ends of the beam.

13. The door of claim 12, wherein the first and second distal ends are attached to the inner door panel.

14. The door of claim 12, wherein:
the reinforcement beam includes a first bracket at the first distal end of the beam and a second bracket at the second distal end of the beam;
the first distal end of the beam is attached to the first bracket and the first bracket is attached to the inner door panel; and
the second distal end of the beam is attached to the second bracket and the second bracket is attached to the inner door panel.

15. The door of claim 14, wherein the first and second brackets are attached to the inner door panel by at least one of a weld and a fastener.

16. The door of claim 9, wherein the third material thickness is greater than each of the first material thickness and the second material thickness.

* * * * *